Patented Aug. 9, 1927.

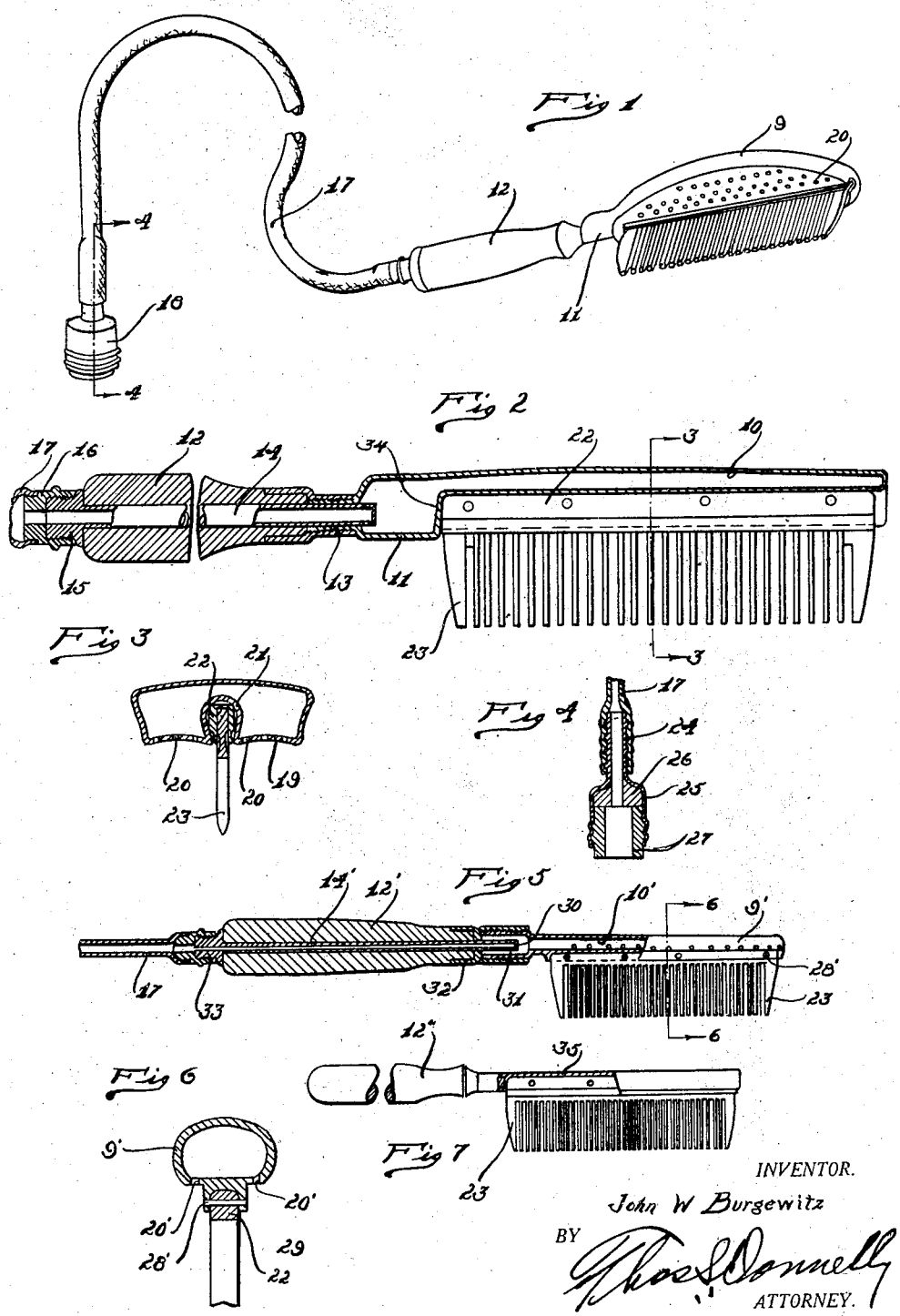

1,638,523

UNITED STATES PATENT OFFICE.

JOHN W. BURGEWITZ, OF DETROIT, MICHIGAN.

FOUNTAIN HAIR COMB.

Application filed February 2, 1927. Serial No. 165,276.

My invention relates to a new and useful improvement in a fountain hair comb, and has for its object the provision of a holder formed tubular and adapted for retaining the comb and arranged for connecting to a source of water supply, so that the water will be delivered to the tubular holder and expelled therefrom through perforations formed therein, so that the device may be used for either combing the hair, while at the same time the stream of water is directed upon it, thus assuring a thorough, easy and quick cleaning of the hair.

Another object is the provision of a device of this kind in which the water is retarded in its travel or deflected from its original course, so as to assure a uniform sprinkling of water throughout the entire length of the comb.

Another object of the invention is the provision in a device of this kind of a comb holder so arranged as to permit easy and quick removal of the comb therefrom and replacement of a comb therein, so that combs of various sizes or of various degrees of fineness may be used, depending upon the nature of the hair which is being washed.

Other objects will appear hereinafter.

The invention consists in the combination and arrangement of parts hereinafter described and claimed.

The invention will be best understood by a reference to the accompanying drawings which form a part of this specification and in which, Fig. 1, is a perspective view of the preferred form of the invention.

Fig. 2 is a longitudinal vertical central fragmentary sectional view of the invention.

Fig. 3 is a view taken on substantially line 3—3 of Fig. 2.

Fig. 4 is a fragmentary sectional view taken on substantially line 4—4 of Fig. 1.

Fig. 5 is a longitudinal vertical sectional view of a modified form of the invention, with a part shown in side elevation.

Fig. 6 is a view taken on substantially line 6—6 of Fig. 5.

Fig. 7 is a fragmentary side elevational view of a modified form, with parts broken away.

In the preferred form, the invention comprises a hollow holder 9 having the chamber 10 formed therein, and communicating with the rearwardly extending neck 11, attached to which is a handle 12, this handle being secured to the neck 11 by means of a ferrule 13 which is threaded upon the neck and securely mounted on the handle 12. Extending through the handle 12 is a tube 14 which is provided exterior of the handle with a nipple 15 upon which is adapted for threading a nipple 16, attached to which is a flexible conduit, tube or hose 17, having the union 18 mounted thereon for attachment to a water faucet or other suitable conduit so as to establish communication between the chamber 10 and a suitable source of water supply, preferably under pressure. The holder 9 is provided with a bottom wall 19 having perforations 20 formed therein, this bottom wall being pressed inwardly to provide the substantially U shaped retaining portion 21 in which is adapted for slidable engagement the head 22 of the comb 23. The holder 9 is made preferably from metal so as to present the resiliency at the open ends of the U shaped retaining portion 21 and prevent undue removal of the comb 23 therefrom. As clearly appears in Fig. 3 the bottom wall of the holder is provided arcuate at opposite sides of the comb, so that the water emanating from the openings or perforations 20 is directed in a course inwardly of the comb 23, so that as the comb is passed through the hair of a person, the water issuing from the perforations will serve to thoroughly clean the hair and scalp as well. The teeth of the comb will serve to loosen the foreign material which may be clinging to the scalp so that a thorough cleansing of the scalp and hair is effected.

It is particularly useful in rinsing the hair so that all foreign material which has been loosened may be removed from the hair, the teeth of the comb serving to raise the hair to elevated position on the head, while the stream of water is directed thereagainst.

In the preferred form I have shown the nipple 18 as adapted for mounting on a faucet which is free from threads, and as shown in Fig. 4 this nipple comprises the neck 24 which is roughened on its periphery and extended into the tube 17. This neck carries a sleeve 25 which embraces the head 26 formed on the neck and embraces a preferably rubber sleeve 27, so that a tight connection with a smooth spigot is effected.

In the form shown in Fig. 5 and Fig. 6 I have limited the size of the holder, the holder 9′ having but a single row of perforations 20′ at opposite sides of the comb, the holder in this instance having the outwardly projecting flanges 28 and 29, sufficiently resilient to tightly grip the head 22 of the comb so as to retain it in position.

In this form the handle 12' is provided with a tubular member 14' which is closed at its end 30 and provided with perforations 31, so that the inwardly flowing water is retarded by the closed end 30 so that when the water flows into the chamber 10', it is not under the heavy pressure that it originally has, while passing through the tube 14', thus assuring a uniform distribution of the water over the chamber 10', so that the water will be directed uniformly against the comb 23 throughout its length. In this form the holder 9' is provided with a cup shaped extension 32 which embraces the handle 12' and a suitable nipple 33 is carried by the opposite end of the handle 12', to which is attached the tube 17'.

In the preferred form, the holder passing through the tube 14 will strike the wall 34, and thus be retarded in its travel, so that the distribution of the water uniformly throughout the chamber 10 at a uniform pressure will be effected.

In Fig. 7 I have shown a holder 35 in which the comb 23 may be removably mounted, this holder having the handle 12'' so that a holder for a comb is provided in which the comb may be removably positioned, when desired, without having the tubular connection for distribution of the water therein.

The structure of the invention is believed evident to be a simple one and quite effective for the purposes intended, while at the same time, it proves most durable in use.

While I have illustrated and described the preferred forms of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described comprising a tubular handle; a tubular holder carried by said handle, having on one of its faces an axially extending groove and provided at opposite sides of said groove with a plurality of perforations and a comb detachably positioned in said groove.

2. A device of the class described comprising a tubular handle; a hollow holder communicating with said handle and carried thereby, said holder having an axially extending groove formed in one of its faces and provided at opposite sides of said groove with perforations; a comb detachably positioned in said groove, said holder having a portion extending transversely of the tube in said handle adjacent the end thereof and providing an abutment for liquid delivered into said holder through said tube.

3. A device of the class described comprising a hollow holder having an axially extending groove formed in one of its faces and provided with perforations in said face; a handle attached to said holder; a tube projected through said handle and communicating with said holder, the inner end of said tube being closed, said tube at its inner end being provided with radially extending openings for permitting the flow of liquid from said tube into said holder; and a hair treating member detachably mounted in said groove.

4. A device of the class described comprising: a hollow holder having an axially extending groove formed in one of its faces and provided with perforations in said face at the side of said groove; a comb detachably positioned in said groove; and a tubular handle on said holder.

In testimony whereof I have signed the foregoing specification.

JOHN W. BURGEWITZ.